United States Patent [19]

Strittmatter et al.

[11] Patent Number: 5,603,840
[45] Date of Patent: Feb. 18, 1997

[54] METHOD OF ACHIEVING MICROBIOLOGICAL CONTROL IN OPEN RECIRCULATING COOLING WATER

[75] Inventors: Richard J. Strittmatter, Batavia; Narasimha M. Rao, Naperville, both of Ill.

[73] Assignee: Nalco Chemical Company, Naperville, Ill.

[21] Appl. No.: 440,790

[22] Filed: May 15, 1995

[51] Int. Cl.⁶ ................................... C02F 1/76
[52] U.S. Cl. ............... 210/698; 162/161; 210/701; 210/754; 210/760; 210/764; 422/15; 422/16
[58] Field of Search ................... 210/698–701, 210/754, 760, 764; 162/161; 422/15–17

[56] References Cited

U.S. PATENT DOCUMENTS

| | | | |
|---|---|---|---|
| 5,171,451 | 12/1992 | Khambatta et al. | 210/764 |
| 5,259,985 | 11/1993 | Nakanishi et al. | 252/180 |
| 5,264,136 | 11/1993 | Howarth et al. | 210/755 |
| 5,415,783 | 5/1995 | Johnson et al. | 210/764 |

OTHER PUBLICATIONS

R. G., J. F. Wilkes, "Bromide Ion—Its Possible biocidal Role with Ozone in cooling Water Treatment", Industrial Water Treatment, 24, 1992, pp. 40–48.

Primary Examiner—Peter A. Hruskoci
Attorney, Agent, or Firm—James J. Drake; Robert A. Miller; Patricia A. Charlier

[57] ABSTRACT

The invention comprises adding bromide to a cooling water system containing corrosion and scale control treatment chemicals at elevated concentrations (40 ppm or greater). A fraction of the recirculating water is drawn off in a side stream and ozonated. Ozone oxidizes bromide to bromine which then serves as a biocide. The bromide levels are chosen such that the ozone/bromide reaction is preferred over the ozone/treatment chemicals reaction. Thus, the addition of bromide at elevated concentrations, while acting as a biocide precursor, serves to protect treatment chemicals necessary for corrosion and scale control.

6 Claims, 5 Drawing Sheets

5,603,840

METHOD OF ACHIEVING MICROBIOLOGICAL CONTROL IN OPEN RECIRCULATING COOLING WATER

BACKGROUND OF THE INVENTION

1. Field of the Invention

A novel method of achieving microbiological control in open recirculating cooling water systems comprising ozonation of the recirculating water in combination with addition of elevated levels of bromide salts (method referred to hence forth as OzoBrom).

2. Description of the Prior Art

The prior art teaches that ozone-activated bromine has been used as a biocide in swimming pools. However, no additional treatment chemicals are necessary for swimming pools. As a result, the bromide levels in swimming pool applications are very low.

Rice and Wilkes have recently reviewed the subject of ozone-activated bromine in cooling water systems (R. G. Rice, J. F. Wilkes, "Bromide Ion—Its Possible biocidal Role with Ozone in Cooling Water Treatment", Industrial Water Treatment, 24, 1992, pp 40–48). Although the concept of ozone-activated bromine in cooling water systems is a known technology, no investigations have been performed in the presence of scale and corrosion control treatment chemicals. The prior art teaches that bromide concentrations of 2–15 ppm are sufficient for proper control. The prior art also teaches that at these bromide concentrations the ozone oxidizes much of the organic material present in the system. Since most corrosion and scale control treatment chemicals are organic, a problem exists in trying to balance the competing interest of scale and corrosion control versus microbial growth control.

Ozone-activated bromine serves as a microbiocide in open recirculating cooling water systems. Existing products used for microbial control in cooling water systems include chlorine, bleach, BCDMH (bromochlorodimethyl hydantoin) or combinations thereof (e.g. chlorine-activated bromine). These products have hazards associated with their transportation, handling and feeding. The in situ production of bromine by ozone eliminates these hazards. Further, reaction of existing microbial control products with small organic molecules can result in the formation of undesirable trihalomethanes (THM). Exposure of the recirculating water to ozone can result in destruction of THM precursors, thus reducing the production of the undesirable by-products.

Strittmatter has shown that ozone destroys most organic-based cooling water treatment chemicals, resulting in improper corrosion and scale control (R. J. Strittmatter, CORROSION/93, Paper #477, NACE: Houston, Tex.). Therefore, it is necessary to prevent oxidation of these treatment chemicals in open recirculating cooling water systems.

SUMMARY OF THE INVENTION

The invention comprises adding bromide to a cooling water system containing corrosion and scale control treatment chemicals at elevated concentrations (40 ppm or greater). A fraction of the recirculating water is drawn off in a side stream and ozonated. Ozone oxidizes bromide to bromine which then serves as a biocide. The bromide levels are chosen such that the ozone/bromide reaction is preferred over the ozone/treatment chemicals reaction. Thus, the addition of bromide at elevated concentrations, while acting as a biocide precursor, serves to protect treatment chemicals necessary for corrosion and scale control.

DESCRIPTION OF THE PREFERRED EMBODIMENTS

Figure 1:
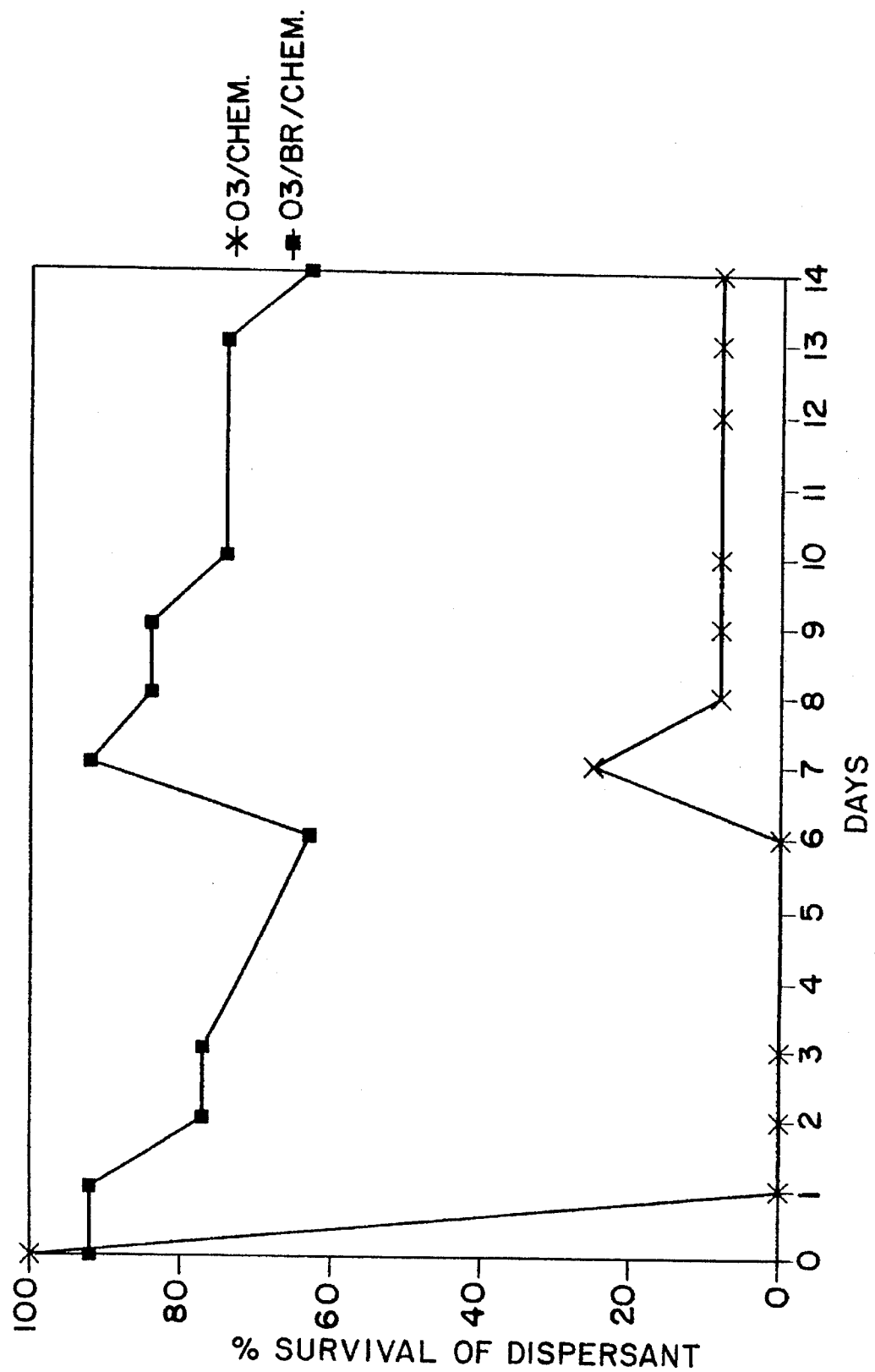
FIG. 1 is a graph comparing the stability of an organic polymeric dispersant in an ozobrom-treated pilot cooling tower test vs. an ozone-treated pilot cooling tower test.

The invention comprises adding a bromide salt to a cooling water system containing corrosion and scale control treatment chemicals at elevated concentrations (40 ppm or greater). A fraction of the recirculating water is drawn off in a side stream and ozonated. Preferably, the bromide salt is selected from among a group including calcium bromide, sodium bromide, potassium bromide, lithium bromide and magnesium bromide. Ozone oxidizes bromide to bromine which then serves as a biocide. The bromide levels are chosen such that the ozone/bromide reaction is preferred over the ozone/treatment chemicals reaction. Thus, the addition of bromide at elevated concentrations, while acting as a biocide precursor, serves to protect treatment chemicals necessary for corrosion and scale control.

Elevated levels of bromide are required to protect the organic-based scale and corrosion control treatment chemicals in the recirculating water from destruction by ozone. With no bromide present, the treatment chemicals are completely destroyed by ozone. In this invention, a minimum bromide concentration has been discovered that sufficiently protects the treatment chemicals from ozonation. At bromide concentrations above the specified level, the ozone/bromide reaction predominates over the ozone/treatment chemical reaction. At bromide concentrations below the specified level, significant ozonation of the treatment chemicals occurs.

It has been discovered that bromide concentrations of 40 ppm or greater is sufficient to protect the organic-based treatment chemicals. The scale and corrosion control treatment chemicals include sulfomethylated acrylate acrylamide co-polymers, aromatic triazoles such as benzotriazole, tolyltriazole and butylbenzotriazole, organic phosphonates such as 2-phosphonobutane-1,2,4-tricarboxylic acid, 1-hydroxyethylidene-1,1-diphosphonic acid, aminotris(methylenephosphonic acid) and hexamethylenediaminetetra(methylenephosphonic acid) and organic acids such as tartaric acid, gluconic acid, citric acid, mesaconic acid, malic acid, aspartic acid and glutaric acid.

In an alternative embodiment of the invention, the method further comprises adding an acid such as sulfuric acid, hydrochloric acid, nitric acid or phosphoric acid to the side stream prior to ozonation. The addition of the acid serves to increase the stability of the ozone and, as a result, increases the efficiency of the ozone/bromide reaction. In yet another embodiment, the acid and bromide are added to the cooling water system in one step in the form of hydrogen bromide.

A second advantage is that the ozone efficiency in converting bromide to bromine is proportional to the bromide concentration. Therefore, operating at an elevated bromide level significantly enhances the ozone efficiency in the conversion of bromide to bromine which in turn cuts down on ozone costs. Moreover, industrial cooling water systems are subject to process (organic) leaks, creating an additional competing reaction for the ozone. Elevated bromide concentrations ensure that the ozone/bromide reaction produces sufficient bromine to achieve microbial control. Therefore, ozonating cooling waters containing high bromide levels provides a safe, cost-effective method of microbiological control with minimal degradation of treatment chemicals.

EXAMPLE 1

Two Pilot Cooling Tower (PCT) tests were performed to study the efficacy of the biocides ozone vs. OzoBrom under typical industrial open recirculating cooling water conditions. Both tests used identical water chemistry, scale and corrosion control treatment chemicals, and operating conditions with one difference: for the OzoBrom test, the basin was slugged with 50 ppm of bromide. In both tests, 0.5 gpm (25% of the recirculation rate) of the water was drawn from the basin and contacted with ozone in a venturi eductor. The amount of ozone input in each case was controlled as to give acceptable microbial counts (<$10^5$ cfu/ml). The concentration of residual oxidant in the tower basin was determined for both tests. The total ozone input rate, the residual ozone concentrations and the total aerobic bacterial counts for both tests are summarized in Table 1.

TABLE I

Ozone input, residual oxidant levels, and total aerobic bacteria for ozone/treatment chemicals and ozone/bromide/treatment chemicals

| PCT TEST | OZONE INPUT | RESIDUAL OXIDANT CONC. | TOTAL AEROBIC BACTERIA |
|---|---|---|---|
| $O_3$/Chem. | 30 mg/min | 0.03 ppm (as $Cl_2$) | 37,000 |
| $O_3$/Chem. | 60 | 0.01 | 14,000 |
| $O_3$/Br/Chem. | 0.7 mg/min | 1.04 ppm | 4,700 |

Figure 2:
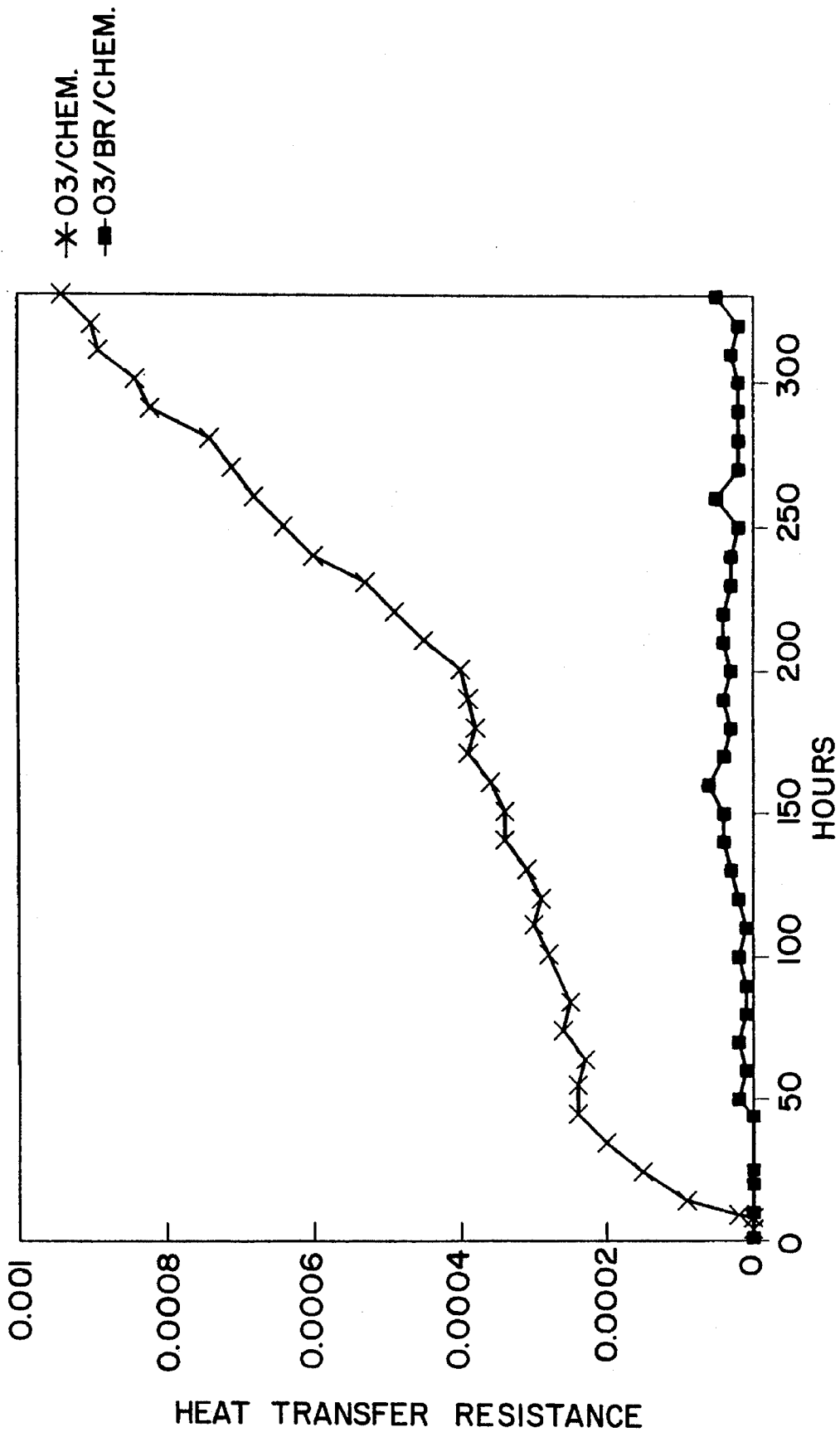
FIG. 2 is a graph comparing the fouling of a heat transfer surface in an ozobrom-treated pilot cooling tower test vs. an ozone-treated pilot cooling tower test.

It can be seen that much higher oxidant levels and much better microbial control are achieved using 50 to 100 times less ozone with OzoBrom relative to ozone. The residual polymer level (FIG. 1) and heat transfer resistance (FIG. 2) were measured for both tests vs. time (the HTR is a measure of scaling on the heat exchanger tubes). FIG. 1 clearly shows that with no bromide present for protection, the polymer is almost completely destroyed, whereas significant concentrations of the dispersant polymer are still present in the presence of bromide. The effect of polymer destruction is clear from FIG. 2, which shows that the HTR increases with time in the case of ozone treatment. No such increase is observed with protection from 50 ppm of bromide.

This example illustrates that ozonation of cooling waters results in almost complete degradation of treatment chemicals with deleterious corrosion and scale control consequences, and that the presence of 50 ppm of bromide provides excellent protection for treatment chemicals during ozonation. Further, the example shows that ozonation of waters containing elevated bromide levels results in excellent microbial control with roughly 50 to 100 times lower amounts of ozone.

EXAMPLE 2

Figure 3:
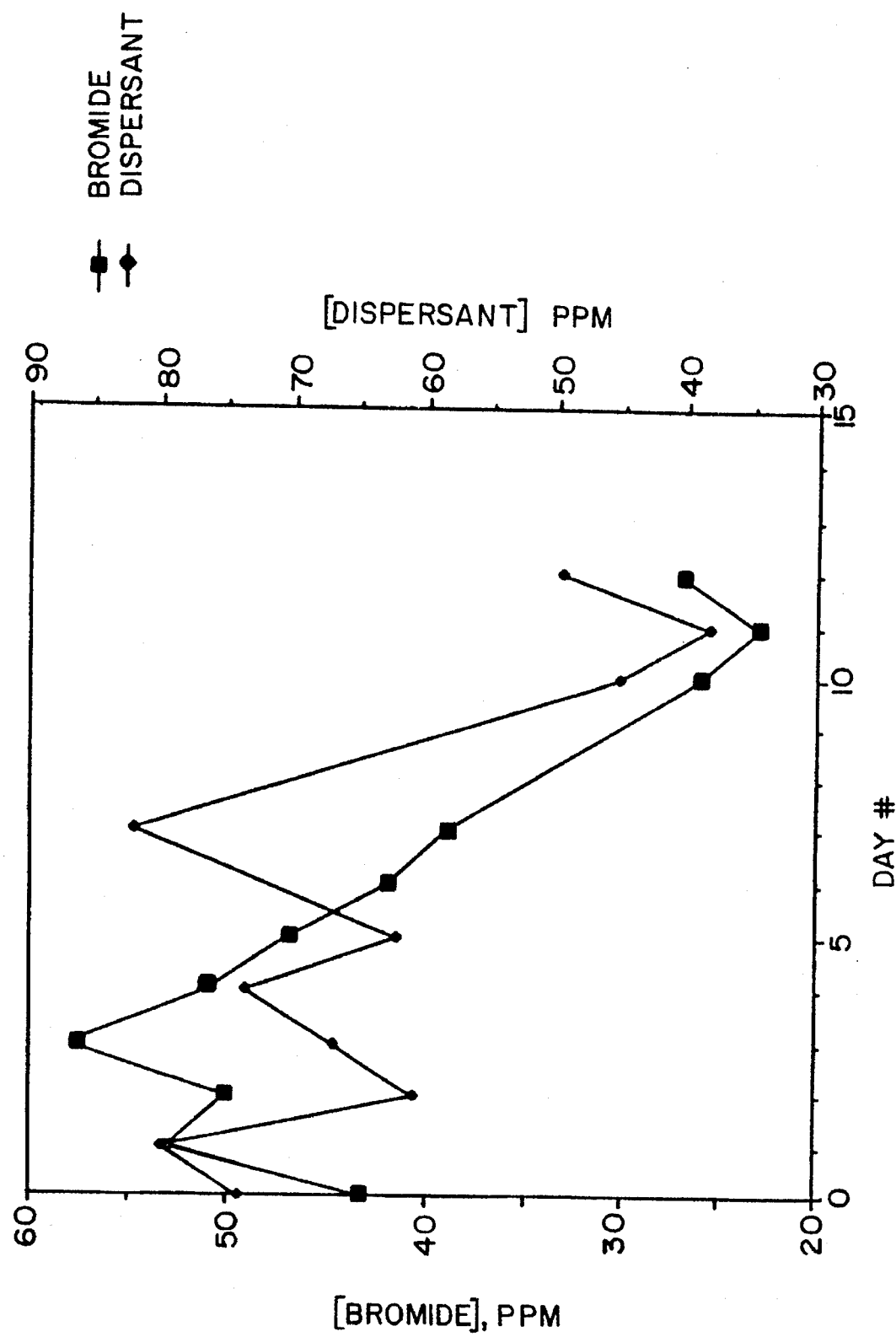
FIG. 3 is a graph showing the correlation between bromide levels and the stability of a dispersant polymer in a cooling tower.
Figure 4:
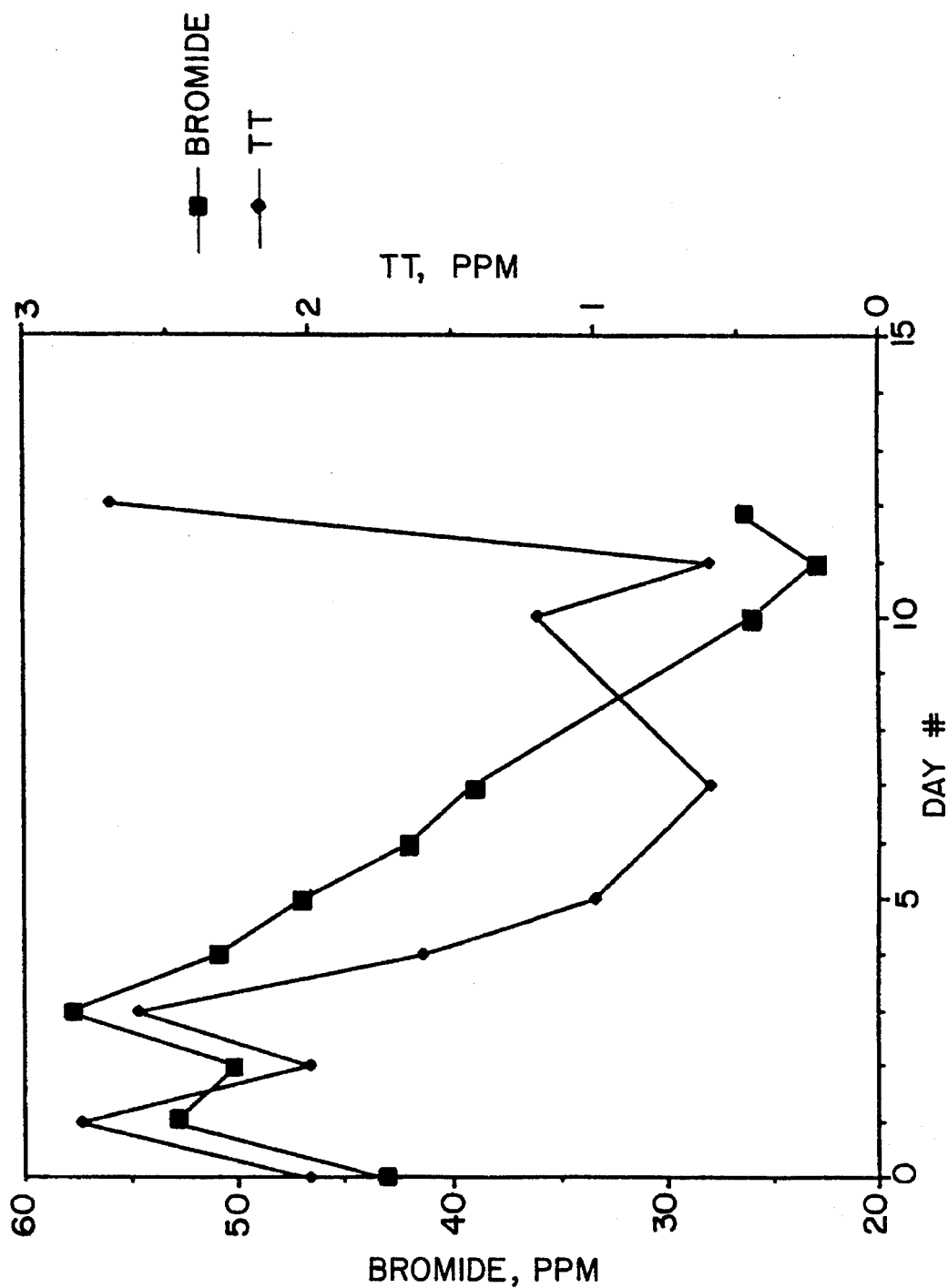
FIG. 4 is a graph showing the correlation between bromide levels and the stability of a yellow metal corrosion inhibitor in a cooling tower.
Figure 5:
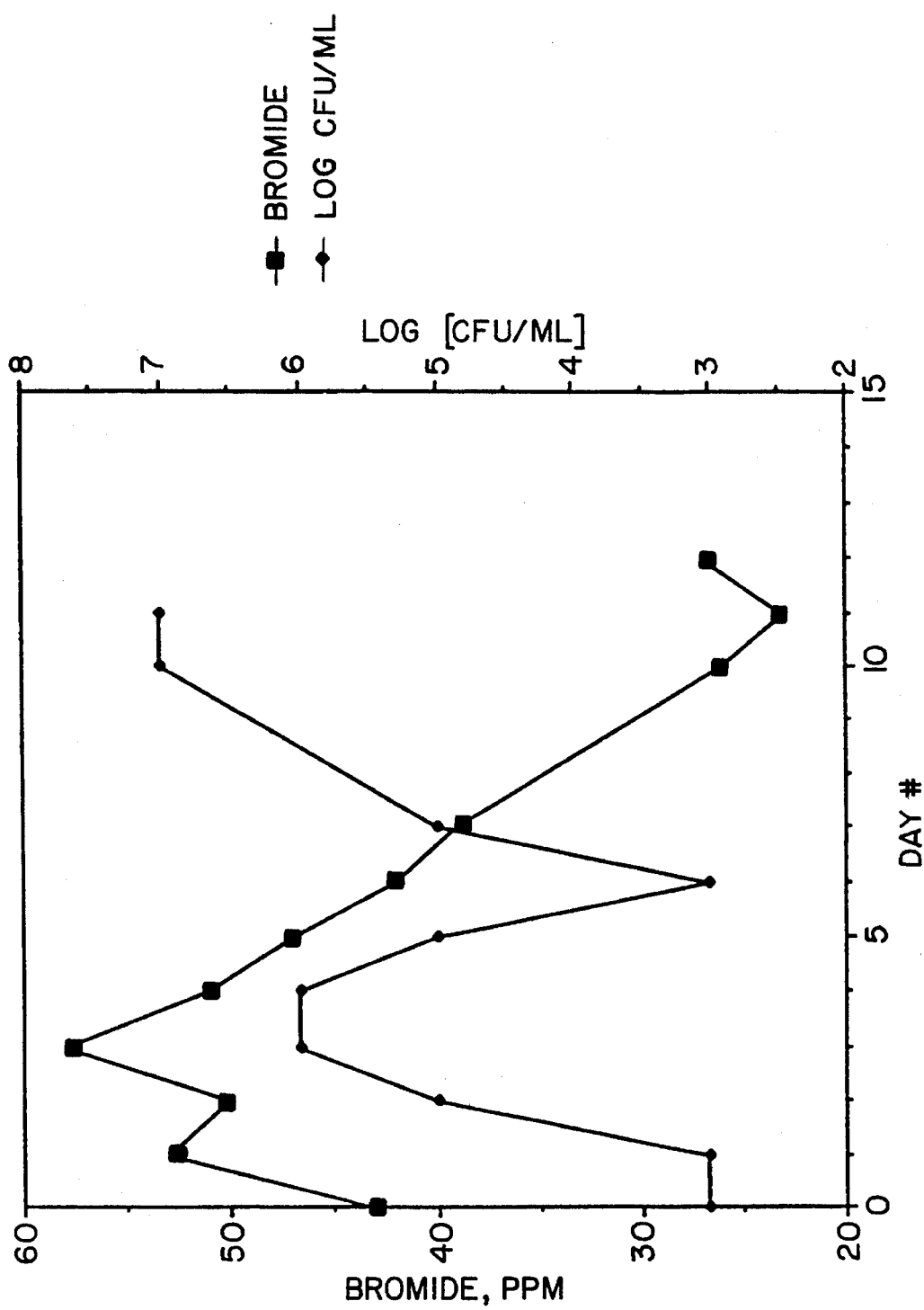
FIG. 5 is a graph showing the correlation between bromide levels and total aerobic bacterial counts.

The conversion of bromide to bromine using ozone was tested at an industrial cooling water system. The tower basin was initially slugged with 50 ppm of bromide and continuous addition of bromide was started. A side stream (approximately 2% of the recirculating volume) from the tower basin was mixed with ozone in a venturi eductor and returned to the tower. The concentration of the bromide, bromine, aromatic triazole and the dispersant polymer in the tower basin was continuously measured. The concentration of bromide was initially held at approximately 50 ppm for about 4 days and then slowly ramped down to 23 ppm over a period of 8 days. The correlation between bromide levels and the treatment chemical concentrations is shown in FIGS. 3 and 4. As can be seen, the dispersant and triazole levels correlate well with bromide levels. FIG. 3 clearly shows that the dispersant polymer levels decrease as the concentration of bromide drops below 40 ppm. FIG. 4 shows a similar trend for aromatic triazole. The spike seen on the last point is due to an aromatic triazole slug added to correct for decreasing triazole levels. The correlation between total aerobic bacterial counts (TABC) and the bromide levels is shown in FIG. 5. The TABC increased initially, reaching approximately $10^6$ cfu/ml within the first 4 days of the test and then started to decrease. This can be attributed to increasing cumulative HOBr levels as more and more bromide is oxidized. However, as the bromide level in the water starts decreasing, the bromine conversion per pass starts decreasing. This eventually decreases cumulative bromine levels, resulting in increased TABC.

This example illustrates that at least 40 ppm of bromide are needed in the recirculating water in order to protect treatment chemicals and to maintain proper microbial control.

EXAMPLE 3

A 1% solution of sodium bromide was contacted with ozone in a packed bed contactor at three different pH values, 6.3, 2.0, and 1.1. The bromine efficiency (fraction of bromide converted to bromine) and ozone efficiency (fraction of ozone converted to bromine) was calculated as a function of pH. It was observed that the bromine efficiency increased from 1.13% at pH 6.3 to 1.74% at pH 2.0 to 2.52 at pH 1.1. The ozone efficiency in this time span was 10.0%, 15.4% and 22.4% respectively. This example illustrates that the bromide and ozone efficiencies can be improved by adding acid to the side-stream prior to ozonation.

Changes can be made in the composition, operation and arrangement of the method of the present invention described herein without departing from the concept and scope of the invention as defined in the following claims:

We claim:

1. A method of reducing microbiological growth in open recirculating cooling water systems containing organic water treatment chemicals selected from the group consisting of sulfomethylated acrylate acrylamide co-polymers and aromatic triazoles, wherein degradation of the organic water treatment chemicals is minimized, the method comprising:

adding a bromide salt in an amount greater than 40 parts per million to an open recirculating cooling water system;

drawing off a side stream from the open recirculating cooling water system;

ozonating the side stream, wherein the step of ozonating oxidizes the bromide to bromine;

returning the side stream to the open recirculating cooling water system; and reducing the microbiological growth in the cooling water system.

2. The method of claim 1, wherein the bromide salt is selected from the group consisting of calcium bromide, sodium bromide, potassium bromide, lithium bromide and magnesium bromide.

3. The method of claim 1, wherein the method further comprises the step of adding a mineral acid selected from the group consisting of sulfuric acid, hydrochloric acid, nitric acid and phosphoric acid to the side stream.

4. The method of claim 1, wherein the treatment chemicals are sulfomethylated acrylate acrylamide co-polymers.

5. The method of claim 1, wherein the bromide is added in the form of hydrogen bromide to the side stream prior to ozonation.

6. The method of claim 1 wherein the aromatic triazoles are selected from the group consisting of benzotriazole, tolyltriazole and butylbenzotriazole.

* * * * *